United States Patent [19]
Kitamura et al.

[11] Patent Number: 5,946,766
[45] Date of Patent: Sep. 7, 1999

[54] CLEANING BELT FOR AN INDUSTRIAL BELT

[75] Inventors: Ichihiro Kitamura; Tatsutoshi Nakajima; Senri Ito, all of Tokyo, Japan

[73] Assignee: Nippon Filcon Co., Ltd., Tokyo, Japan

[21] Appl. No.: 08/837,825

[22] Filed: Apr. 22, 1997

[30] Foreign Application Priority Data

Apr. 26, 1996 [JP] Japan .................................. 8-140587

[51] Int. Cl.⁶ .................................................. B65G 45/10
[52] U.S. Cl. ........................ 15/256.5; 162/199; 162/272; 198/497; 210/392; 210/396
[58] Field of Search ......................... 15/238–241, 256.5; 34/111, 116, 123; 162/199, 272; 198/494, 497–499; 210/392, 396

[56] References Cited

U.S. PATENT DOCUMENTS

| | | | |
|---|---|---|---|
| 232,336 | 9/1880 | Cooley | 15/238 X |
| 383,772 | 5/1888 | Schleber | 15/241 |
| 386,126 | 7/1888 | Hainsworth | 15/241 |
| 401,066 | 4/1889 | Reeves | 15/239 |
| 736,358 | 8/1903 | Bruhn | 15/239 |
| 1,045,762 | 11/1912 | White | 15/240 |
| 1,734,255 | 11/1929 | Hedfelt | 210/396 X |
| 2,320,052 | 5/1943 | Rodriguez | 15/238 X |
| 2,449,796 | 9/1948 | Suskind | 15/238 |
| 2,784,464 | 3/1957 | Larsvall | 15/239 X |
| 2,878,926 | 3/1959 | Harty et al. | 198/497 |
| 4,116,762 | 9/1978 | Gardiner | 162/199 |
| 4,498,577 | 2/1985 | Veenhof | 198/499 |
| 4,703,845 | 11/1987 | Veenhof | 198/499 |
| 5,341,607 | 8/1994 | Perneezky | 451/529 |

FOREIGN PATENT DOCUMENTS

| | | | |
|---|---|---|---|
| 3227192 | 1/1984 | Germany . | |
| 649636 | 5/1979 | U.S.S.R. | 198/498 |
| 268517 | 4/1927 | United Kingdom | 15/239 |
| 1295297 | 11/1972 | United Kingdom | 15/239 |

*Primary Examiner*—Mark Spisich
*Attorney, Agent, or Firm*—Foley & Lardner

[57] ABSTRACT

The invention provides a cleaning method for removing dirt on an industrial belt and a cleaning belt used in the same. A cleaning belt having through-holes is provided onto an industrial belt. The cleaning belt comprises structural unit pieces in parallel to one another in a lengthwise direction. Each of the unit pieces is loosely interconnected and has a play such that the unit piece can move. The movement gives vibration onto the industrial belt when the cleaning belt is brought in contact with the surface of a running industrial belt. Then dirt on the industrial belt is removed through the through-holes.

15 Claims, 6 Drawing Sheets

FIG.7

CLEANING BELT FOR AN INDUSTRIAL BELT

BACKGROUND OF THE INVENTION

This invention relates to an industrial belt cleaning method and a cleaning belt for an industrial belt used in the same.

The term "belt" as used in the present invention denotes cloth-, belt- and sheet-shaped bodies, woven and knitted stuff, and the like.

The term "industrial belt" denotes specifically a forming fabric, felt, canvas for use in a papermaking machine, belt for producing nonwoven fabric, drying belt, conveyor belt and filter cloth. However, it is not limited to these. More specifically, this invention relates to the cleaning of cloth for papermaking.

SUMMARY OF THE INVENTION

An industrial belt is stained by the adhesion of part of a structure mounted thereon with the passage of days of use.

To cope with this problem, studies are being conducted on the material of thread constituting the belt and various attempts are being made to improve the processing of a surface resin and to install a brush roll for cleaning and a shower for high-pressure cleaning.

As for the studies on the material of the belt, out of the above conventional countermeasures, only the selection of a material is not sufficient in effect and has a great tendency to exert an adverse effect on the other physical properties such as dimensional stability of an industrial belt. In addition, it has been impossible for a user to change the material to another suitable one. The processing of the surface resin involves a durability problem and such a problem as deterioration in gas permeability and the brush roll cannot provide a sufficient effect. The shower for high-pressure cleaning is expensive and involves such a problem as troublesome maintenance of the apparatus.

In the papermaking industry currently, the consumption of chemicals has been increasing due to the use of waste paper and the improvement of the quality of paper with the result of deterioration in the degree and quality of dirt. When dirt is becoming serious, such problems as reductions in dehydrating ability and drying ability are caused by deterioration in gas permeability. Further, a paper tear accident occurs frequently, resulting in serious problems such as a bad influence on productivity and a reduction in the quality of paper.

An object of the present invention is to provide a method for cleaning an industrial belt, which is sufficiently effective and can be easily carried out on a user side at a low cost, and a cleaning belt for an industrial belt used in the same.

The present invention relates to a method for cleaning an industrial belt that may comprise (1) preparing a cleaning belt having end portions and formed by arranging belt structural unit pieces in parallel to one another in a lengthwise direction, (2) providing a play and loosely interconnecting the structural unit pieces such that they can move, (3) bringing the surface of the cleaning belt in contact with the surface of a running industrial belt to remove dirt on the industrial belt. Both end portions in a lengthwise direction of the cleaning belt can be hung over and apart from the industrial belt and an intermediate portion between the both end portions of the cleaning belt may be brought into contact with the surface of the industrial belt by its own weight. In the method, the cleaning belt can be installed such that a part thereof is positioned above a roll on which the industrial belt is placed. The structural unit pieces of the cleaning belt can be interconnected such that they can move and generate vibration when they are moved by their contact with the industrial belt, thereby removing dirt.

A cleaning belt also can be formed by arranging a plurality of belt structural unit pieces extending in a breadthwise direction in parallel to one another in a lengthwise direction. The structural unit pieces arranged in the lengthwise direction can be interconnected such that they can move with respect to an axis parallel to the breadthwise direction. The cleaning belt can then be brought into contact with the surface of a running industrial belt to generate vibration in the cleaning belt, and dirt can be removed by providing this vibration to the industrial belt.

The cleaning belt may have through-holes extending to both front and rear surfaces. The dirt removed can thereby be caused to come up to a surface opposite to the contact surface with the cleaning belt through the through-holes. Thereby the dirt can be prevented from staying between the cleaning belt and the industrial belt.

The cleaning belt can have end portions and formed by disposing belt structural unit pieces arranged in a breadthwise direction of the belt in parallel to one another in a lengthwise direction of the belt, providing a play and loosely interconnecting the structural unit pieces such that they can move, and forming through-holes extending to both front and rear surfaces of the belt. The belt structural unit piece can be a bar-shaped body. The bar-shaped body can be interconnected with a thread body in the form of, e.g., a reed screen. A through-hole can be formed between bar-shaped bodies. The bar-shaped body may be formed by interconnecting a plurality of pieces obtained by dividing the bar-shaped body in a breadthwise direction of the belt with a thread body in the breadthwise direction. The bar-shaped body which can be divided into pieces in a breadthwise direction and interconnected with connecting thread bodies in a breadthwise direction can be arranged by shifting every other one of the bar-shaped bodies in the breadthwise direction. Further the connecting thread body can be extended in an oblique direction sequentially to interconnect the bar-shaped bodies in the lengthwise direction.

A belt structural unit piece can be a hollow cylindrical body into which a connecting rod is inserted. The connecting rod can be interconnected with a thread body such that the hollow cylindrical body can freely rotate. A through-hole can be formed between the cylindrical bodies.

The belt structural unit piece can be a block having a substantially oval or rectangular side surface. A connecting hole can be formed near both ends thereof in a lengthwise direction. A front portion of a block and a rear portion of a next block may be arranged alternately. A connecting rod having a smaller diameter than that of a connecting hole formed in a block can be inserted into the connecting hole. A play may be provided so that the blocks can be slidably interconnected. A through-hole can be formed between a front portion of each block and a rear portion of its adjacent block in a lengthwise direction.

The belt structural unit piece can be a substantially oval or rectangular ring. The belt can be formed by arranging the rings in a breadthwise direction of the belt so that the flat surfaces of the rings can form a belt surface, disposing them in a zigzag form by shifting every other one of the rings, and interconnecting the rings with thread bodies in an oblique direction.

The belt structural unit piece may be a spiral coil and the belt may be formed by engaging the spirals of spiral coils, providing a play in a common hole formed thereby, and inserting a connecting rod into the common hole. The industrial belt can be installed such that both end portions thereof can be arranged above and apart from the industrial belt. An intermediate portion between the both end portions of the belt can be brought into contact with the surface of the industrial belt by its own weight.

DETAILED DESCRIPTION OF PREFERRED EMBODIMENTS

The structure of a cleaning belt is not particularly limited if a structural unit piece vibrates when it contacts a running industrial belt by its own weight. Various structures may be used such as a woven structure, knitted structure, felt structure, structure that a fabric base is coated with a resin, reed screen-like structure, structure that spiral wire materials are interconnected by connecting rods and the like.

The material of the structural unit piece may be a metal such as stainless steel, a plastic such as polyester, nylon or polyphenylene sulfide, ceramic, rubber or the like.

While preferred embodiments of the present invention will be described hereinafter, a flexible cleaning belt which can transform can be used. The reason for this is that an entire cleaning belt can be uniformly contacted to an industrial belt if the cleaning belt is flexible. If it is not flexible, it will have a portion contacting the industrial belt and a portion failing to contact the industrial belt. Therefore, there is the possibility that cleaning can be incomplete.

As for a method for installing a cleaning belt, both end portions of the cleaning belt can be installed apart from and above the industrial belt and an intermediate portion between the both end portions of the cleaning belt can be brought in contact with the surface of the industrial belt by its own weight. Owing to this contact, the cleaning belt can be brought into contact with the industrial belt at a uniform pressure in accordance with changes in surface conditions, such as the surface and thickness of the industrial belt. Thus the risk that the end portions of the cleaning belt run and collide with the industrial belt to damage it can be avoided.

The cleaning belt can be installed in such a way that a part of the cleaning belt is positioned above a roll on which the industrial belt is placed. By installing the cleaning belt like this, the weight of the cleaning belt can be supported by the roll and a load given onto the industrial belt can be reduced.

As the cleaning belt to be brought into contact with the industrial belt can be formed by arranging in a lengthwise direction of the belt a plurality of structural unit pieces extending in a breadthwise direction, providing a play and loosely interconnecting the structural unit pieces such that they can, move with respect to an axis parallel to a breadthwise direction. The cleaning belt thus formed transforms flexibly with respect to the axis parallel to the breadthwise direction and the entire cleaning belt can be brought into uniform contact with the industrial belt as described above. When the cleaning belt contacts the industrial belt, the structural unit pieces of the cleaning belt move owing to the play present between the pieces and vibration is generated. When vibration is generated in the cleaning belt, the vibration is transmitted to the industrial belt as a matter of course. When the industrial belt vibrates, dirt is easily separated and released from the surface of the industrial belt. As a result, the dirt comes off effectively. Further, as the vibration prevents the removed dirt from staying between the industrial belt and the cleaning belt, the removed dirt is conveyed on the industrial belt. This effect obtained by the vibration is excellent especially on a portion above the roll described above. Above the roll, the vibration can be transmitted efficiently because the industrial belt moves according to the vibration and does not absorb the vibration.

Further, by using a cleaning belt having through-holes which extend from the front surface facing the industrial belt to the rear surface, removed dirt comes up to the rear surface of the cleaning belt from the through-holes. Therefore, the amount of the removed dirt staying between the industrial belt and the cleaning belt is further reduced. If the dirt stays there, the amount of dirt will increase gradually and the industrial belt and the cleaning belt will not contact each other at the end with the result that the cleaning belt will have no effect at all.

Further, since there is a play between the structural unit pieces interconnected, the cleaning belt can, for example, stretch in a lengthwise direction and move in a vertical direction. Therefore, vibration is generated between the structural unit pieces by their contact with the industrial belt, whereby the dirt can be removed more effectively.

According to the present invention, the industrial belt from which dirt is removed is not particularly limited as described above. Since dirt is removed by vibration generated by contact, a better effect can be obtained for a drier belt in a dry state rather than a belt in a wet state. The cleaning belt of the present invention is particularly useful for cleaning a canvas for a papermaking machine whose dirt is becoming a serious problem as described above.

A cleaning belt of the present invention can be arranged such that its surface is brought into contact with the surface of the industrial belt over a predetermined length while the industrial belt runs. An intermediate portion between both end portions of the cleaning belt can contact the surface of the industrial belt by its own weight when both the end portions are arranged above and apart from the industrial belt. A cleaning belt comprises a plurality of structural unit pieces extending in a breadthwise direction which can be arranged in parallel to one another in a lengthwise direction and interconnected such that they can move with respect to an axis parallel to the breadthwise direction, and that through-holes can be formed in the surface.

As an example of the cleaning belt stated above, there is a reed screen-like belt formed by interconnecting bar-shaped bodies of structural unit pieces with thread bodies. Since the bar-shaped bodies extending in a breadthwise direction are interconnected by the thread bodies in this reed screen-like belt, the belt can move in a lengthwise direction and a vertical direction. Therefore, it can transform flexibly and hence, can contact the surface of the industrial belt uniformly, and the bar-shaped bodies can move and vibrate by the travelling of the industrial belt. A gap between the bar-shaped bodies serves as a through-hole.

A cleaning belt formed by inserting connecting rods into respective hollow cylindrical bodies and connecting the connecting rods with thread bodies generates great vibration because of the rotation of the cylindrical bodies in addition to the function of the above belt using the bar-shaped bodies. When the diameter of the connecting rod is made smaller than the inner diameter of the cylindrical body and a play is provided, a greater vibration generation effect is obtained.

In a reed screen-like cleaning belt such as the above one, the bar-shaped body or cylindrical body extending in a breadthwise direction can be divided into a plurality of pieces. When divided, each cylindrical body piece rotates or moves independently and a bar-shaped body piece moves independently so that flexibility further improves with a better vibration effect. When the divided bar-shaped body pieces are interconnected with thread bodies in a breadthwise direction and the thread bodies are interconnected with warp bodies in an oblique direction by shifting every other one of the thread bodies, the bar-shaped body pieces can move in three dimensions. Therefore, a great vibration effect is obtained.

Further, a structural unit of a cleaning belt may be formed of a block having connection holes near front and rear end portions. The block of the present invention may include a plate-like body. The blocks are arranged in a breadthwise direction such that a front portion of a block and a rear portion of the next block alternate with each other and a connecting rod is inserted into the connection holes to interconnect the blocks in the form of a belt. A play is provided between the connection hole and the connecting rod, whereby the blocks move back and forth and in a vertical direction and generate vibration. The play can be formed simply by using the connecting rod having a smaller diameter than that of the connection hole.

As for the shape of the block, the block can have a substantially oval or rectangular side and a prolonged bottom from a view point of its contact with the industrial belt. A through-hole is formed between a front portion of a block and a rear portion of the next block.

The belt structural unit may be a circular or rectangular ring. The ring used in the present invention includes not only a ring formed by interconnecting end portions of a wire but also one with a central hole formed in the middle of a plate-like body. This belt is formed by arranging such rings in a breadthwise direction by shifting every other one of the rings to form a zigzag shape, inserting thread bodies into the holes of the rings and interconnecting the thread bodies in an oblique direction. The interconnection in an obliqule direction is carried out by inserting the thread body crosswise from a lower left hole to an upper right hole and from a lower right hole to an upper left hole.

If the above belt having a so-called bias structure is knitted stuff and has a play in the central hole, it can have stretchability and can move when it contacts the running industrial belt, thereby can generate vibration. Both those holes formed between the rings and the central holes formed in the rings serve as through-holes.

Alternatively, a belt structural unit of a cleaning belt may be a spiral coil. When a belt is formed by inserting a connecting rod into a common hole formed by engaging the spirals of the spiral coils, the coils move back and forth and right and left, thereby generating vibration. The interval of the spiral of the Spiral coil serves as a through-hole.

The cleaning belt has end portions which are supported above the industrial belt, is hanging and contacts the industrial belt by its own weight. Since this contact is caused by its own weight, cleaning can be carried out well by vibration.

The connecting rod as used herein includes not only a linear one but also one that is wavy formed.

The following embodiments are given to further illustrate the present invention.

Figure 1:
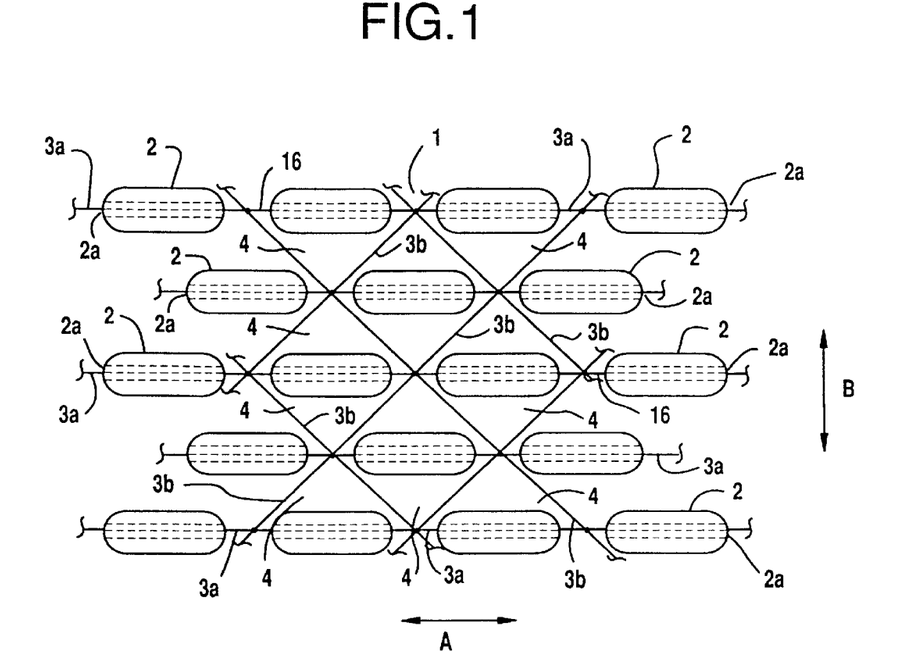
FIG. 1 is a plan view of a cleaning belt according to an embodiment of the present invention.
Figure 1A:
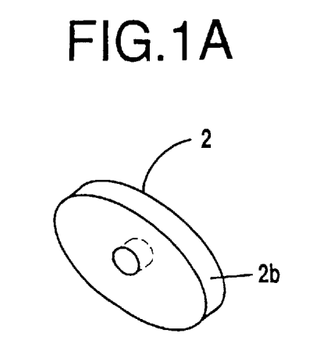
FIGS. 1a–1d show perspective views of structural unit pieces of the present invention.
Figure 1B:
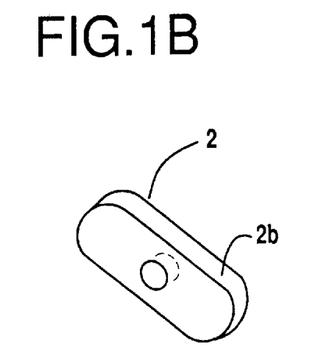
Figure 1C:
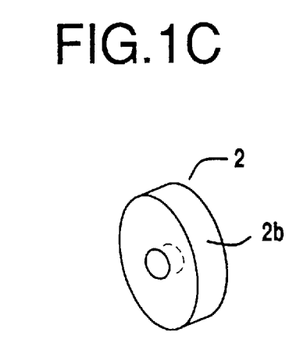
Figure 1D:
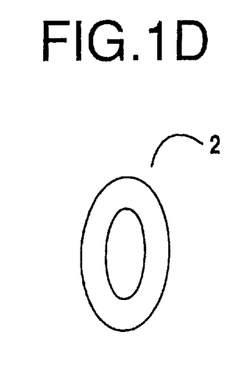

FIG. 1 is a plan view of a cleaning belt according to an embodiment of the present invention. The cleaning belt of FIG. 1 is formed by interconnecting each of bar-shaped structural unit pieces 2 having a through-hole 2a at the center as shown in broken lines and divided in a plurality of rows in a breadthwise direction A of the belt by inserting weft bodies 3a into the central holes of the bar-shaped bodies 2. These structural unit pieces 2 are arranged in a zigzag form by shifting every other one of the interconnected bar-shaped bodies 2 and the weft bodies 3a extended in the breadthwise direction A are interconnected by warp bodies 3b extended in an oblique direction to form a reed screen-like belt. Since it has such a bias structure, its stretchability is large in a lengthwise direction B and a vibration effect is provided by the movement of each of the structural units 2.

While the bar-shaped structural unit pieces 2 used in this embodiment are divided in a plurality of rows in a breadthwise direction A, they may be a plate material having an oval, oblong or circle having a flat surface 2b or a ring-shape, as shown in FIGS. 1a–1d respectively. Each of the structural unit pieces 2 has a good cleaning effect because its contact area with an industrial belt 8 is large. Further, it has such an advantage that it contacts the industrial belt smoothly and does not damage it.

An alternative structural unit piece 2 having an oval or circular section, for example, or having a ball-shaped body can be used though it has a slightly lower cleaning effect than the above one.

Particularly where there is the risk that the structural unit piece might damage the industrial belt, the use of a structural unit piece having an acute angle is not preferred.

A cleaning belt 1 having structural unit pieces 2 arranged as described above has an advantage that the structural unit pieces 2 can be brought into uniform contact with the industrial belt. As a matter of course, the structural unit pieces 2 may be interconnected not only in a zigzag form but also in a gridiron form. Alternatively, the structural unit pieces 2 may be interconnected by binding or bonding.

A through-hole 4 can be formed around the structural unit pieces 2, the weft bodies 3a and warp bodies 3b. Since removed dirt 10 (shown in FIG. 7) comes up to the surface of the cleaning belt 1 from the through-hole 4, it does not tend to stay between the industrial belt 8 and the cleaning belt 1. If the dirt stays there, the amount of the dirt increases gradually and the industrial belt 8 and the cleaning belt 1 do not contact each other at the end with the result that a cleaning effect can be ineffective.

Figure 2:
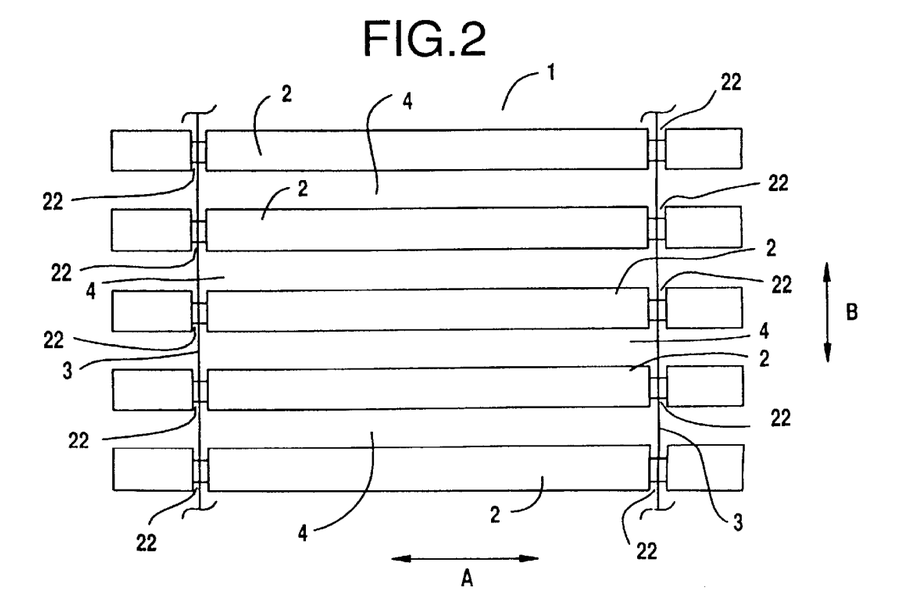
FIG. 2 is a plan view of a cleaning belt according to another embodiment of the present invention.

FIG. 2 is a plan view of a cleaning belt 1 according to another embodiment of the present invention.

In FIG. 2, the cleaning belt 1 is formed by interconnecting a plurality of structural unit pieces 2 by thread bodies 3 and arranging them in a lengthwise direction B.

The structural unit piece 2 of this embodiment is a continuous cylindrical structural unit piece extending in a breadthwise direction A.

Since the cleaning belt 1 is a reed screen-like structural body, each structural unit piece 2 can move in a lengthwise direction B.

The cleaning belt 1 of this embodiment using such cylindrical structural unit pieces 2 having a uniform thickness has such advantages that it has a good cleaning effect because its contact area with the industrial belt 8 is large and that it contacts the industrial belt 8 smoothly and does not damage the industrial belt 8.

Figure 2A:
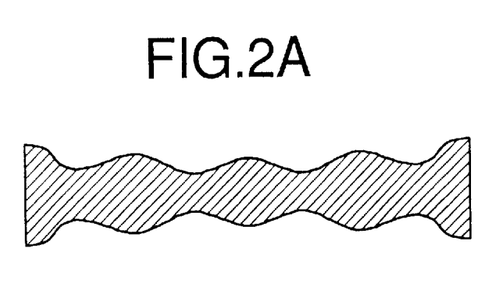
FIGS. 2a and 2b are sectional views of other embodiments of structural unit pieces of the present invention.
Figure 2B:
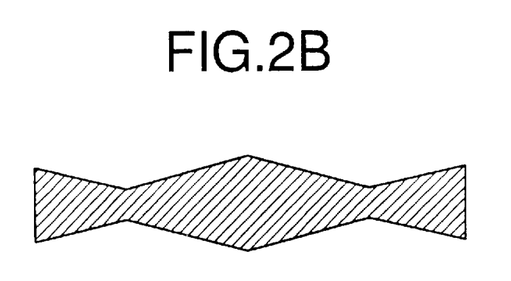
Figure 2C:
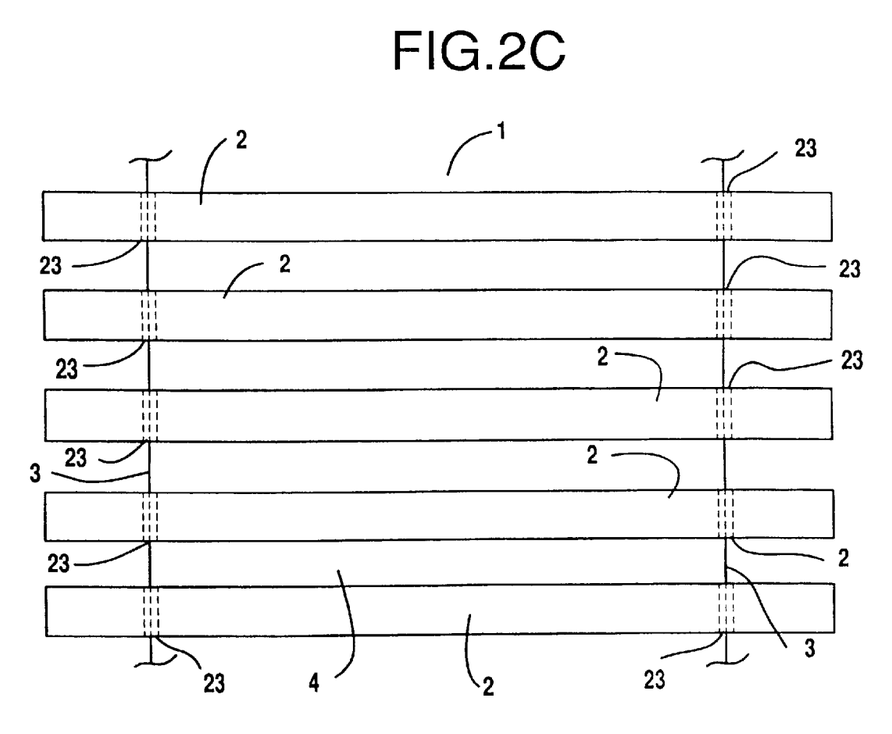
FIG. 2c shows a plan view of a cleaning belt according to yet another embodiment of the present invention.

As an alternative, cylindrical structural unit piece 2 may be used either having a wavy section when cut in a breadthwise direction A as shown in FIG. 2a or having a nonuniform thickness in a breadthwise direction A as shown in FIG. 2b.

In this embodiment, the structural unit pieces 2 and the thread bodies 3 are interconnected by forming a groove 22 in the surfaces of the structural unit pieces 2 in a circumferential direction and winding the thread body 3 round this groove 22. This can prevent the abrasion of the thread body.

Alternatively, they may be interconnected by knitting them, by forming a hole 23 in the structural unit piece and inserting the thread body 3 into the hole 23, or by bonding.

In this embodiment, a through-hole 4 is formed between the structural unit pieces 2.

The weft and warp bodies 3a, 3b and 3 can be arranged without contacting the industrial belt 8. The reason for this is that the abrasion of the weft or warp body 3a, 3b or 3 can be eliminated to prevent it from being cut.

Figure 3:
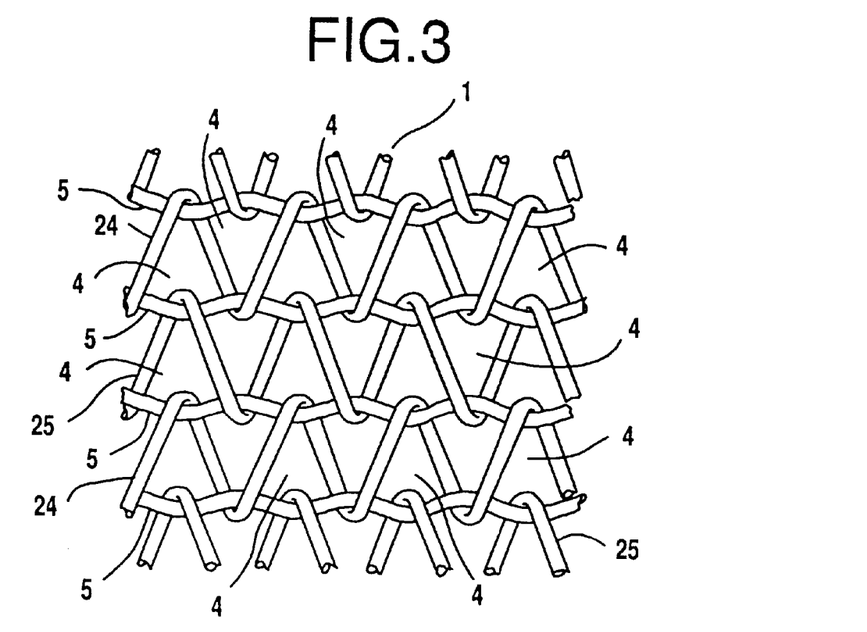
FIG. 3 is a plan view of a cleaning belt according to still another embodiment of the present invention.

FIG. 3 shows a cleaning belt 1 according to still another embodiment of the present invention.

Figure 4:
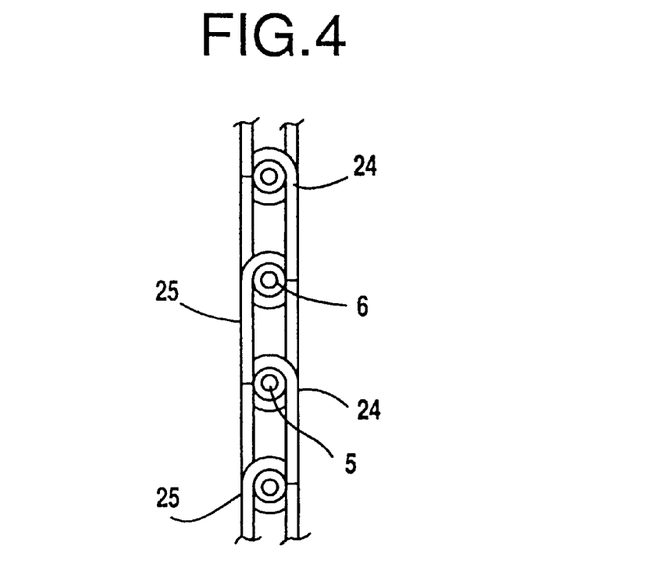
FIG. 4 is a side view se en from a breadthwise direction of FIG. 3.

The cleaning belt 1 of FIG. 3 is formed by interconnecting a plurality of spiral coils 24, 25 which are structural unit pieces 2 by connecting rods 5 in a widthwise direction and arranging spiral coils 24, 25 in a lengthwise direction B. FIG. 4 is a side elevational view thereof.

The plurality of spiral coils 24, 25 are arranged in parallel to one other and combined with one another by engaging them with one another and the connecting rod 5 is inserted into a common hole 6 (FIG. 4) formed by the combination of each spiral of the spiral coils 24 and 25 being engaged alternately to interconnect the spiral coils 24 and 25.

The spiral coils 24 move three-dimensionally around the connecting rod 5. This embodiment is formed by combining clockwise spiral coils 24 and counterclockwise spiral coils 25 alternately. When a cleaning belt 1 is formed like this, the angle of the spiral coil in contact with the travelling surface does not incline toward one direction. Therefore, there is such an advantage that the travelling property becomes stable. It is needless to say that only clockwise spiral coils 24 may be combined or only counterclockwise spiral coils 25 may be combined.

In this embodiment, a connecting rod 5 is formed wavy in accordance with the pitch of the spiral coils 24, 25. When the connecting rod 5 is formed like this, there is such an advantage that the connecting rod 5 can be prevented from coming out. There is another advantage that the spiral coils 24, 25 can be positioned and a play is formed between the spiral coils 24, 25 to prevent the contact between the coils.

When the diameter of the connecting rod. 5 is made smaller than the diameter of a common hole 6, the spiral coils 24, 25 can move, whereby a good vibration generation effect can be obtained.

Also in this embodiment, a through-hole 4 is formed between the spiral coil and the connecting rod 5.

FIG. 4 is a sectional view cut in a lengthwise direction B of FIG. 3, wherein the connecting rod 5 is inserted into the common hole 6 formed by engaging the spiral coils 24, 25.

Figure 5:
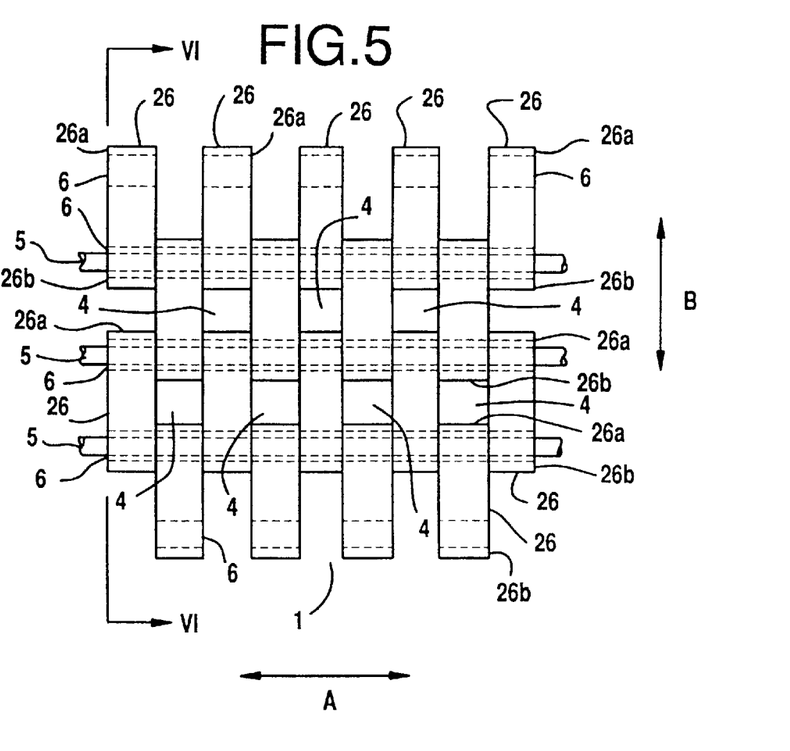
FIG. 5 is a plan view of a cleaning belt according to a further embodiment of the present invention.

FIG. 5 shows a cleaning belt 1 according to another embodiment of the present invention.

In FIG. 5, the cleaning belt 1 is formed by interconnecting a plurality of block-shaped structural unit pieces 26 with connecting rods 5 and arranging them in a lengthwise direction B.

The plurality of block-shaped structural unit pieces 26 of this embodiment have each two through-holes 6 near both front end portion 26a and rear end portion 26b thereof.

A front portion 26a of a block 26 and a rear portion 26b of the next block 26 are arranged in a breadthwise direction A by aligning their through-holes 4 so that a connecting rod 5 is inserted into the thus aligned common hole 6. This interconnection of the blocks 26 is repeated to form the cleaning belt. The block 26 can substantially have the shape of an oblong, oval or rectangular cross section in a lengthwise direction B. In the embodiment of FIG. 5, the block 26 has an oblong cross section. A through-hole 4 is formed between a front portion of a block and a rear portion of a block interconnected with the block.

Figure 6:
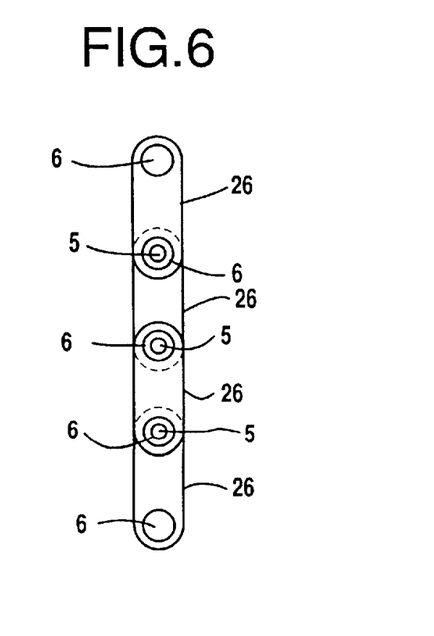
FIG. 6 is a side view along the line VI—VI of FIG. 5.

FIG. 6 is a sectional view cut along line VI—VI in a lengthwise direction B of FIG. 5, wherein the connecting rod 5 having a smaller diameter than that of the common hole 6 is inserted into the common hole 6 of the block 26 and a play is present therebetween. When there is a play therebetween, the block 26 can move, whereby a good vibration effect can be obtained.

Figure 7:
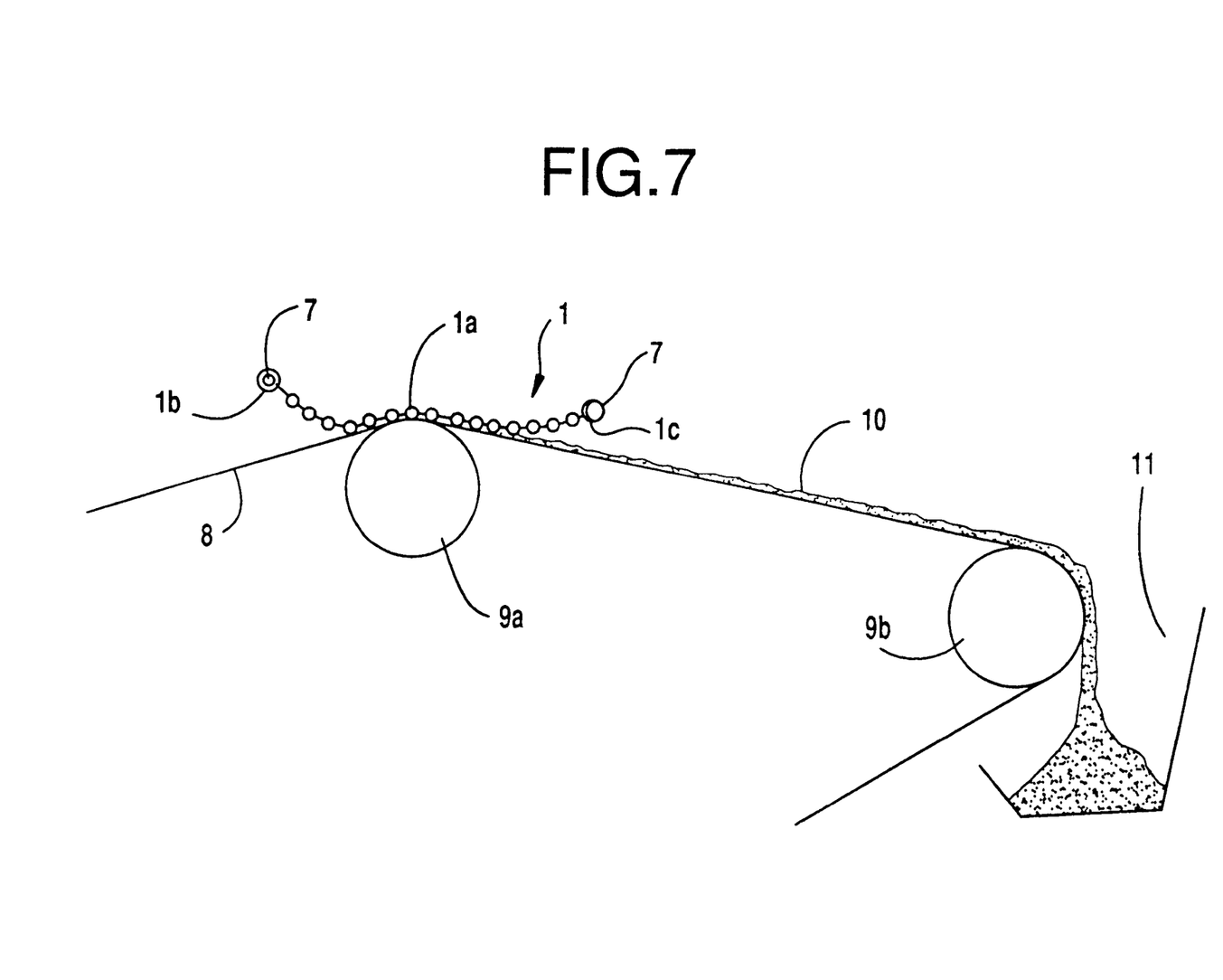
FIG. 7 is a diagram for explaining how to use the cleaning belt of the present invention.

FIG. 7 shows how to use the cleaning belt 1 of the present invention. The cleaning belt 1 is installed such that it contacts the surface of the industrial belt 8.

A description is subsequently given of how to install the cleaning belt 1 of this embodiment.

An attachment rod 7 is attached to both two end portions 1b and 1c of the cleaning belt 1 and hung over or above and apart from the industrial belt 8.

When the cleaning belt 1 is installed by hanging both end portions 1b and 1c, an intermediate portion 1a between the both end portions 1b and 1c of the cleaning belt 1 contacts the surface of the industrial belt 8 by its own weight. When the cleaning belt 1 is installed in this manner, there is no risk that the end portions of the cleaning belt 1 run and collide with the industrial belt 8 to damage it. Further, such an advantage can be obtained that the cleaning belt 1 can be brought into contact with the industrial belt 8 with a uniform pressure in accordance with changes in surface conditions such as the surface and thickness of the industrial belt 8. Further, there is another advantage that the contact length can be changed according to the condition of dirt by changing the position of the attachment rod 7.

The cleaning belt 1 is installed such that a part thereof is positioned above a roll 9a which supports the industrial belt 8. When the cleaning belt 1 is installed like this, the weight of the cleaning belt 1 can be supported by the roll and a burden on the industrial belt 8 can be reduced advantageously.

The industrial belt 8 is placed on the roll 9a and runs over the roll 9a. The travelling of the industrial belt 8 makes it possible to bring the entire length of the industrial belt 8 into contact with this cleaning belt 1. By this contact, dirt 10 on the industrial belt 8 comes off. The removed dirt 10 may be carried on the industrial belt 8 as shown in FIG. 7, be fallen by the rotation of the rolls 9a and 9b and collected in a dirt collection box 11 positioned close to the roll 9b.

The width, length and contact length of the cleaning belt 1 may be set to appropriate values according to the condition of dirt 10. It is reasonable to make the width of the cleaning belt 1 almost the same as the width of the industrial belt 8.

As described on the foregoing pages, the present invention provides a cleaning belt 1 which is fully effective and used simply and easily, and which can remove and prevent dirt on an industrial belt 8 without providing a special cleaning apparatus.

The entire disclosure of Japanese Patent Application No. 8-140587 filed on Apr. 26, 1996, including specification, drawings and claims are herein incorporated by reference in its entirety.

Although only a few exemplary embodiments of this invention have been described in detail above, those skilled in the art will readily appreciates that many modifications are possible in the exemplary embodiments without materially departing from the novel teachings and advantages of this invention. Accordingly, all such modifications are intended to be included within the scope of this invention.

What is claimed is:

1. In combination with an endless industrial belt supported by rolls, a cleaning belt adapted to contact a surface of the industrial belt and remove dirt therefrom, the cleaning belt further comprising:

a plurality of loosely interconnected structural unit pieces defining a plurality of through-holes therein and the cleaning belt having first and second end portions, at least one of the first and second end portions of the cleaning belt being arranged above and apart from the industrial belt whereby an intermediate portion of the cleaning belt, between the first and second end portions, is brought into contact by its own weight with a surface of the industrial belt for cleaning the industrial belt.

2. The cleaning belt according to claim 1, wherein the plurality of structural unit pieces are arranged in a breadthwise direction of the cleaning belt in parallel to one another in a lengthwise direction of the cleaning belt.

3. The cleaning belt according to claim 2, wherein the structural unit pieces being interconnected with a thread body.

4. The cleaning belt according to claim 2, wherein the through-holes are formed around the structural unit pieces between a front surface of the cleaning belt and a rear surface of the cleaning belt.

5. The cleaning belt according to claim 2, wherein the structural unit pieces are bar-shaped extending in the breadthwise direction and interconnected with warp bodies in the lengthwise direction.

6. The cleaning belt according to claim 5, wherein a plurality of the bar-shaped structural unit pieces are interconnected in the breadthwise direction.

7. The cleaning belt according to claim 6, wherein the bar-shaped structural unit pieces are arranged by shifting every other one of the bar-shaped pieces in the breadthwise direction, the bar-shaped pieces being interconnected in the lengthwise direction with the warp bodies extended in an oblique direction sequentially.

8. The cleaning belt according to claim 2, wherein the belt further comprises a connecting rod, wherein each of the structural unit pieces comprises a connecting hole into which the connecting rod is inserted.

9. The cleaning belt according to claim 2, wherein each of the belt structural unit pieces have substantially one of an oblong, oval, rectangular, and a ring shape, and define a connecting hole being formed therethrough.

10. The cleaning belt according to claim 9, further comprising one of a thread body and a rod, which is inserted into the connecting hole.

11. A cleaning belt according to claim 10, wherein a play is provided between the structural unit piece and the thread body or the rod inserted through the connecting hole.

12. The cleaning belt according to claim 2, wherein the structural unit pieces arranged in a breadthwise direction of the belt, being arranged in parallel in a lengthwise direction in a zigzag form by shifting every other one of the belt structural unit pieces, the structural unit pieces being interconnected with a weft body in the breadthwise direction and with a warp body in an oblique direction.

13. The cleaning belt according to claim 2, wherein the belt structural unit pieces are shaped as spiral coils, two of the spiral coils being interconnected by a connecting rod being inserted into the two spiral coils whose spirals are engaged alternately.

14. The cleaning belt according to claim 1, wherein the intermediate portion being positioned above one of the rolls.

15. The cleaning belt according to claim 1, wherein both of the first and second end portions are arranged above and apart from the industrial belt.

* * * * *